3,324,149
6-AZIDO-3,5-CYCLOANDROSTANES
Leslie A. Freiberg, Waukegan, Ill., assignor to Abbott Laboratories, North Chicago, Ill., a corporation of Illinois
No Drawing. Filed Oct. 31, 1966, Ser. No. 590,557
5 Claims. (Cl. 260—349)

This application is a continuation-in-part of Ser. No. 436,379, filed Mar. 1, 1965, now abandoned.

The present invention is directed to a new class of steroids; more particularly it is directed to 3α,5α-cycloandrostanes carrying an azido group in the 6α- or the 6β-position and a carboxy or a carboalkoxy group in the 17-position.

The new compounds have the formula

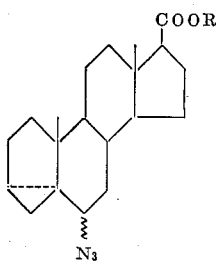

wherein R is hydrogen or an alkyl group of 1 to 8 carbon atoms, which may be in a straight or a branched chain. The new compounds are made from 5-androstenes carrying at 17 the corresponding substituent and a 3-substituent of the configuration R'SO$_2$O wherein R' is loweralkyl, phenyl or tolyl. The new compounds are important intermediates for the preparation of 6-aminosteroids and N-substituted 6-aminosteroids which are useful growth-regulating agents when administered subcutaneously in doses of 1–10 mg./kg. to warm-blooded animals. The aminosteroids referred to above can easily be obtained from the corresponding 6-azido analogues by reductive cleavage without changing the steric position of the substituent. Both steric isomers are included in the scope of this invention as identified by the jagged line in the above formula at position 6.

In a simple embodiment, the new compounds are made by treating a 17β-carbomethoxy-5-androstene carrying a substituent of formula R'SO$_2$O in the 3β-position with an appropriate azide salt in a protic or dipolar aprotic solvent at a temperature between 50° and 120° for a period of at least 30 minutes, diluting the reaction mixture with cold water, and separating the formed 6α-azido and 6β-azido compounds by chromatography. The obtained azido compounds can be reduced by known means to the corresponding 6-amino compounds which in turn can be acylated or alkylated in the amino group in known fashion.

In order to show specific embodiments, the following examples are given as illustrations: they are not meant to limit the invention in any respect.

Example 1.—6α-azido-17β-carbomethoxy-3α,5α-cycloandrostane

To a solution of 30 grams of sodium azide in 450 ml. of anhydrous dimethylsulfoxide heated to 85° C. is added 7 grams of 17β-carbomethoxy-5-androstenyl 3β-p-toluenesulfonate. The mixture is heated with occasional swirling at 85° for 2 hours after which time the reaction mixture is poured into 3000 ml. of water. The aqueous mixture is extracted with ether and the etheric solution is washed with water and dried over anhydrous magnesium sulfate before evaporating the solvent. Partial purification of the residue is effected by removal of the 3α-azido-17β-carbomethoxy-5-androstene by-product by crystallization from methanol/water. The combined material (5 grams) from the mother liquors of two batches is chromatographed over chromatography-grade magnesium silicate and the product is eluted with hexane/benzene mixtures of decreasing hexane content. The fractions with a 1:3 hexane/benzene ratio contain 170 mg. of 6α-azido-17β-carbomethoxy-3α,5α-cycloandrostane which after recrystallization from methanol/water shows a melting point of 125–126.5° C. and $[\alpha]_D^{25}$ of 116.4° as a 1.03% solution in chloroform. The analytical values obtained are in close agreement with those calculated for the compound of empirical formula $C_{21}H_{31}N_3O_2$.

When in the above example the starting material is replaced by an equivalent amount of 17β-carboethoxy-5-androstenyl 3β-p-toluenesulfonate one obtains 6α-azido-17β-carboethoxy-3α,5α-cycloandrostane of empirical formula $C_{22}H_{33}N_3O_2$.

Example 2.—6β-azido-17β-carbomethoxy-3α,5α-cycloandrostane (a) The fractions collected by elution of the column of Example 1 with pure benzene are concentrated and the residue is crystallized from methanol/water to yield 6β-azido-17β-carbomethoxy-3α,5α-cycloandrostane, M.P. 122–123.5° $[\alpha]_D^{23}+68°$ as a 0.96% solution in chloroform. The analytical values obtained are in close agreement with those calculated for the compound of empirical formula $C_{21}H_{31}N_3O_2$.

(b) a 3.00 g. sample of 17β-carbomethoxy-5-androstenyl 3β-p-toluenesulfonate is suspended in 200 ml. of 0.9 M methanolic lithium azide [prepared according to Huisgen and Ugi, Chem. Ber., 90, 2914 (1957)]. The mixture is refluxed for 24 hours with stirring. After cooling, the mixture is poured into 500 ml. of water, and the product is extracted with two 200-ml. portions of ether. The ether is washed with four 100-ml. portions of water. The ether is dried over magnesium sulfate and evaporated to give 2.04 g. of the crude azide product. This material is chromatographed over chromatographic-grade magnesium silicate. Elution of the column with 100:1, then 50:1 benzene/ethyl ether mixtures provides 0.95 g. of 6β-azido-17β-carbomethoxy-3α,5α-cycloandrostane.

Example 3.—6α-azido-17β-carboxy-3α,5α-cycloandrostane

To a solution of 100 mg. of 6α-azido-17β-carbomethoxy-3α,5α-cycloandrostane in 16 ml. of methanol is added a solution of 400 mg. of potassium hydroxide in 4 ml. of water. The mixture is refluxed for 18 hours under nitrogen, then diluted with 20 ml. of water. The methanol is evaporated with a rotary evaporator and the aqueous solution is filtered. The filtrate is acidified with 6 N hydrochloric acid to pH 4 to produce a precipitate which is identified as 6α-azido-17β-carboxy-3α,5α-cycloandrostane and which shows analytical values in good agreement for those calculated for empirical formula $C_{20}H_{29}N_3O_2$.

By converting the compound so obtained to the corresponding acid chloride and subsequent treatment thereof with butyl alcohol in known fashion, 6α-azido-17β-carbobutoxy-3α,5α-cycloandrostane is obtained in almost quantitative yield.

Example 4.—6β-azido-17β-carboxy-3α,5α-cycloandrostane

In the manner described in Example 3, 6β-azido-17β-carbomethoxy-3α,5α-cycloandrostane is converted to 6β-azido-17β-carboxy-3α,5α-cycloandrostane.

Example 5.—6β-amino-17β-carbomethoxy-3α,5α-cycloandrostane

To a solution of 102 mg. of 6β-azido-17β-carbomethoxy-3α,5α-cycloandrostane in 5 ml. of acetic acid/ethyl ether 1:1 is added, in portions during one hour at 25° C., 1.2 g. of acid-washed electrolytic zinc sponge followed by the addition of 10 ml. of ether and a solution of 3.0 g. of sodium hydroxide in 8.5 ml. of water. The mixture is filtered and the zinc cake is washed with 75 ml. of ether in portions. The aqueous phase is separated and the ether is washed with water, dried over magnesium sulfate and evaporated to give 77 mg. 6β-amino-17β-carbomethoxy-3α,5α-cycloandrostane, M.P. 112.0–113.5°, $[\alpha]_D^{23}$ of +66.2° as a 1.02% chloroform solution, which shows analytical values in good agreement with those calculated for the compound of empirical formula $$C_{21}H_{33}NO_2$$

When in the above examples the sodium azide is replaced by lithium azide or potassium azide, essentially the same results are obtained. Dipolar, aprotic solvents, such as dimethyl sulfoxide, dimethylformamide, methylacetamide, dimethylacetamide, and the like, favor formation of the 6α-azide, while protic solvents, e.g. ethanol, methanol and aqueous mixtures thereof favor formation of the 6β-azide.

The process is preferably carried out at a temperature between 50° and 120° C. for a period of at least 30 minutes. When the reaction mixture is stirred within the above temperature range for more than 24 hours, no appreciable increase in yield is observed, so that generally a time period of between 0.5 and 24 hours produces best results. It will be understood by those skilled in the art that when one uses a nucleophylic, aprotic solvent which boils or decomposes below the above upper limit of 120° C., the reaction is to be carried out below that temperature, e.g. when dimethylsulfoxide is used as a reaction medium, the reaction temperature should not be much above 90° C. to prevent decomposition. However, even with partial decomposition of the solvent, the reaction will proceed to a certain extent as desired.

The sodium azide used in the above examples may be replaced by other azides such as potassium azide, lithium azide, and organic azides such as tetrabutylammonium azide. Using an organic azide has certain advantages, particularly since such azides are more soluble in the specified reaction media and therefore less of the solvent is needed to keep the reactants in solution.

Since several competing reactions take place between the above-named co-reactants, it is important to use the proper mole ratio of azide. It has been found that best results are obtained by using 5–40 moles of the azide per mole of the steroidal starting material. As mentioned above, the steroidal starting materials may be the 5-androstenes carrying at 17 a carboxy group or a carboxy group esterified with loweralkyl alcohols, e.g. carbomethoxy, carboethoxy, and the like. In all instances, the 3-substituent is a group of the formula $R'SO_2O$—wherein $R'$ is lower-alkyl, phenyl, or tolyl, which are all easily accessible by esterification from the corresponding 3-hydroxy-5-androstene carrying the specified substituent at 17.

The new products, namely the 6-azido-3,5-cyclosteroids specified above, are isolated from the reaction mixture by chromatography over a magnesium silicate column. It has been found of importance to use this material in the column since when using other standard chromatographic materials, decomposition or rearrangements of the steroid may take place, e.g. the 6α-azido compounds may revert to other isomers.

I claim:
1. A steroid of the formula

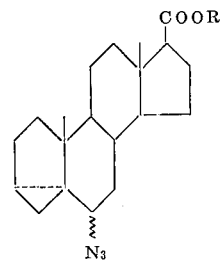

wherein R is hydrogen or an alkyl group of 1 to 8 carbon atoms.

2. The compound of claim 1 wherein R is methyl and the azido group is in the 6α-position.

3. The compound of claim 1 wherein R is methyl and the azido group is in the 6β-position.

4. The group of claim 1 wherein R is hydrogen and the azido group is in the 6α-position.

5. The compound of claim 1 wherein R is hydrogen and the azido group is in the 6β-position.

References Cited

UNITED STATES PATENTS 2,520,656  8/1950  Reichstein _____ 260—397.1

OTHER REFERENCES

Jones, Chem. and Inst., pages 179 and 180 (1962).

LEWIS GOTTS, Primary Examiner.

THOMAS M. MESHBESHER, Assistant Examiner.